(No Model.)
C. C. HOLTER.
FARM GATE.
No. 475,316.  Patented May 24, 1892.
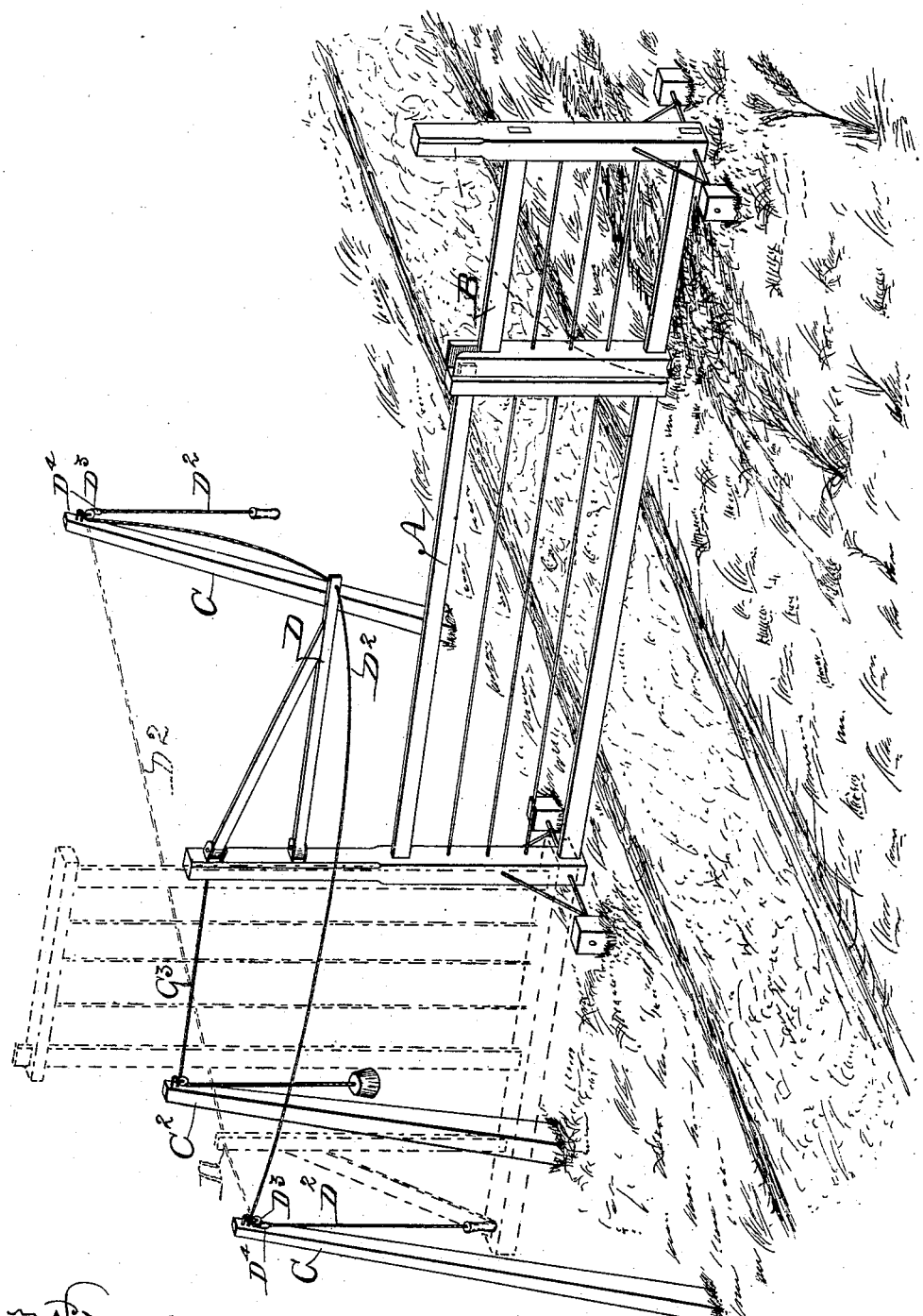

UNITED STATES PATENT OFFICE.

CHRISTIAN C. HOLTER, OF ROLAND, IOWA.

FARM-GATE.

SPECIFICATION forming part of Letters Patent No. 475,316, dated May 24, 1892.

Application filed September 25, 1891. Serial No. 406,775. (No model.)

*To all whom it may concern:*

Be it known that I, CHRISTIAN C. HOLTER, a citizen of the United States of America, residing at Roland, in the county of Story and State of Iowa, have invented a new and useful Improvement in Farm-Gates, of which the following is a specification.

My invention relates to a certain farm-gate for which Letters Patent of the United States were issued to me, bearing date of June 2, 1891, and No. 453,188.

My object is to provide means whereby the power applied to operate the gate may be brought to bear on the top of the rear upright supporting-post of the gate, thereby securing an increased leverage, and to provide means for eliminating the lateral strain upon the hinge of the gate.

My invention consists in the construction and application of a hinged arm to the rear upright supporting-post of the gate in the manner hereinafter set forth, pointed out in my claims, and illustrated in the accompanying drawing, in which—

The entire gate with my improvements applied, as required in practical use, is illustrated in perspective, the dotted lines showing the gate opened.

Referring to the aforesaid drawing, the letter A is used to designate a farm-gate, which is hinged at its rear lower corner to posts driven into the ground and is adapted to be tilted backward.

B is an auxiliary gate of the same kind as the gate A, adapted to enlarge the opening as required to admit farm implements, &c., requiring a broad passage-way.

C are supplementary posts situated on opposite sides of the gate and having their tops somewhat higher than the rear upright post of the gate and placed in alignment therewith.

D is a wooden arm having a brace at its top, and the rear ends of both are hinged to the top portion of the rear upright post of the gate in such a manner as to prevent all vertical movement of the arm and at the same time allow an unrestricted lateral movement thereof. This arm extends approximately parallel with the gate.

$D^2$ is a rope fixed to the outer end of the arm D and extended through pulleys $D^3$, fixed to the tops of the posts C.

$D^4$ are stops attached to the rope $D^2$ and adapted to engage the pulleys $D^3$ and prevent the rope from sagging at its central portion and from sliding through the pulleys, so that when one end of the rope is pulled to open the gate the arm D will move laterally until the slack in the rope is taken up and the stop $D^4$ engages the pulley. It will be seen that as the posts C are higher than the arm D and in the rear of it the tendency will be to elevate the arm D, which, it is obvious, will tilt the gate over backward.

$C^2$ represents an auxiliary post placed in the rear of the gate. A rope $C^3$, with a weight on its lower end, passes through a pulley fixed to the top of the said post and is attached to the top of the rear upright supporting-post of the gate. This rope $C^3$ is of such a length and so arranged as to hold the weight elevated when the gate is either open or closed, thereby partially balancing the weight of the gate and reducing the amount of applied force required to open the gate to a minimum.

The practical operation of the hinged arm is as follows: When power is applied to the one end of the rope to open the gate, the first effect thereof will be to move the arm laterally and take up any slack in the rope. Then as the gate is being elevated the outer end of the arm will swing laterally, so that all the motion transmitted to the gate is in a backward and upward direction, the lateral strain incident to a pull upon the rope having all been taken up by the arm.

Having thus described my invention, what I claim as new, and desire to secure by Letters Patent, is—

1. An improved farm-gate hinged at its rear lower corner to tilt backward, an arm extending from the front face of its rear upright and hinged to swing in a plane approximately at right angles thereto, two posts situated on opposite sides of the gate, having their tops above the said arm and in alignment with the rear upright post of the gate, and a rope passing through pulleys in the tops of the said posts and attached to the free end of the aforesaid hinged arm and provided with stops in juxtaposition to the said pulleys on the said posts, all constructed and combined substantially in the manner set forth, and for the purposes stated.

2. In combination with a farm-gate which opens by being tilted backward, an arm extending from the front face of its rear upright and hinged to swing in a plane approximately at right angles thereto, for the purposes stated.

3. An improved farm-gate comprising a gate hinged at its rear lower corner to posts driven into the ground, an arm extending from the front face of its rear upright and hinged to swing in a plane approximately at right angles thereto, two posts situated on opposite sides of the gate and having their tops above the said arms and in alignment with the rear end of the gate, a rope passing through pulleys in the tops of the posts, attached to the free end of the aforesaid arm and provided with stops in juxtaposition to the pulleys, for the purposes stated, and an auxiliary gate hinged at its rear lower corner to posts driven into the ground and having the top of its post, which is in juxtaposition to the main gate, provided with a forked portion to admit a projecting end of the top bar of the gate, in the manner set forth, and for the purposes stated.

CHRISTIAN C. HOLTER.

Witnesses:
JAS. D. FERNER,
F. J. BAUMGARDNER.